United States Patent
Kermel

[11] 4,011,729
[45] Mar. 15, 1977

[54] DEVICE FOR LAYING SUBMARINE PIPELINES

[75] Inventor: Louis Kermel, Le Mesnil-Saint-Denis, France

[73] Assignee: C. G. Doris, Paris, France

[22] Filed: Sept. 23, 1975

[21] Appl. No.: 616,018

[30] Foreign Application Priority Data

Oct. 3, 1974 France .............. 74.33292

[52] U.S. Cl. .............................................. 61/112
[51] Int. Cl.² ........................................ F16L 1/00
[58] Field of Search .............. 61/72.3, 72.1, 112, 61/113; 114/206 R

[56] References Cited

UNITED STATES PATENTS

| | | | |
|---|---|---|---|
| 3,262,275 | 7/1966 | Perret | 61/72.3 |
| 3,568,456 | 3/1971 | Van Loenen | 61/72.3 |
| 3,835,655 | 9/1974 | Oliver | 61/72.3 |

FOREIGN PATENTS OR APPLICATIONS

| | | | |
|---|---|---|---|
| 1,222,669 | 1/1960 | France | 61/72.3 |

Primary Examiner—Jacob Shapiro
Attorney, Agent, or Firm—Laurence R. Brown

[57] ABSTRACT

The present invention relates to devices for laying submarine pipelines, in which the pipeline, associated with floats attached to it at intervals, the whole assembly being contrived in order to produce a certain buoyancy, is equipped with chains resting upon the bed of the body of water and performing the function of a guide rope. The weight of those parts of the chains extending between the bed of the body of water and the pipeline, maintains the latter submerged at a certain distance above the bed of the body of water and the pipeline can be towed, for example by means of a tug, without any risk of it being damaged by striking said bed.

The improvement which forms the object of the invention consists in attaching the chains or their equivalent, for example cables, not merely to the pipeline itself, but also to the floats. This has the advantage that when the floats are released in order to lay the pipeline on the bed of the body of water, the chains are returned to the surface by the floats themselves and can therefore be readily recovered.

4 Claims, 4 Drawing Figures

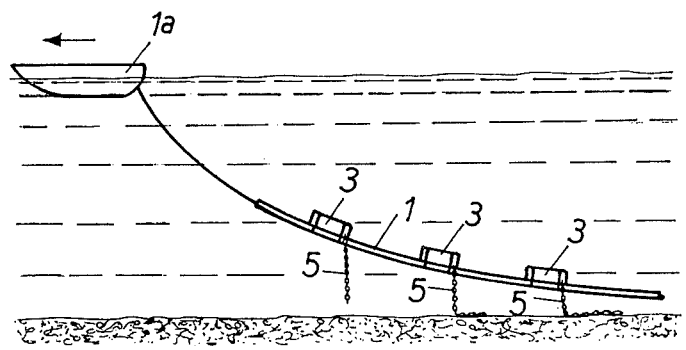
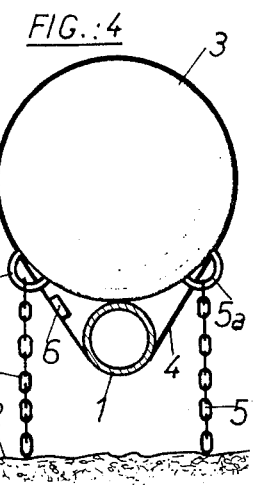
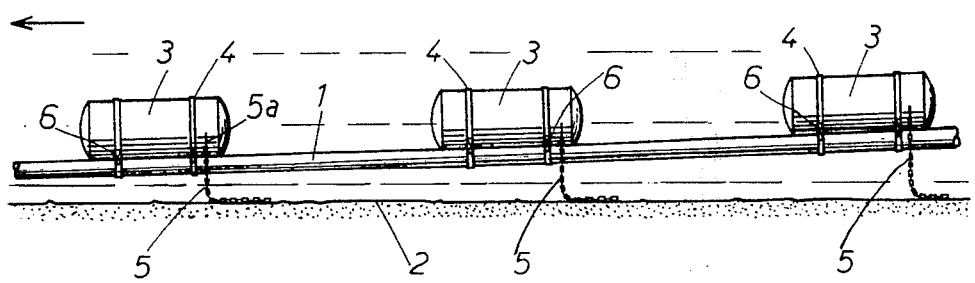
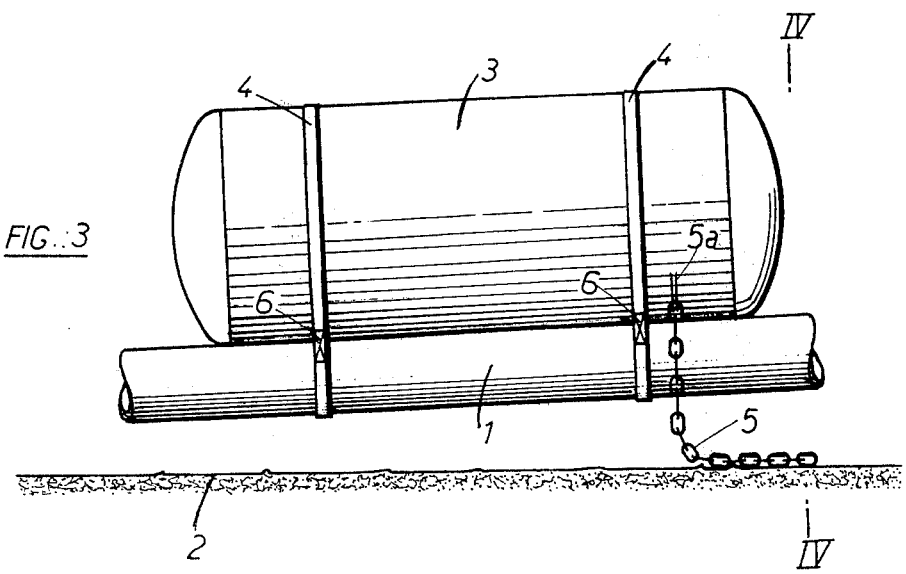

DEVICE FOR LAYING SUBMARINE PIPELINES

The present invention relates to devices for laying submarine pipelines, in which the pipeline, associated with floats attached to it at intervals, the whole assembly being arranged to have a certain buoyancy, is equipped with chains resting upon the bed of the body of water and performing the function of a guide rope. The weight of those parts of the chains extending between the bed of the body of water and the pipeline, maintains the latter submerged at a certain interval above the said bed and the pipeline can be towed, for example by means of a tug, without any risk of it being damaged by striking the bed of the body of water.

The improvement which forms the subject of the present invention, consists in attaching the chains, or their equivalent, for example cables, not only to the pipeline itself, but also to the floats. This has the advantage that when the floats are released, in order to lay the pipeline on the bed of the body of water, the chains are returned to the surface by the floats themselves and can therefore easily be recovered.

The description which now follows, in relation to the attached drawing given by way of non-limitative example, will indicate how the invention may be put into effect, the features contained both in the drawing and in the text forming, self-evidently part of the invention.

FIG. 1 is a schematic, vertical elevational view of a pipeline during laying, equipped with a device in accordance with the invention.

FIG. 2 illustrates a section of the pipeline on a larger scale.

FIG. 3 is a view of a float on a larger scale.

FIG. 4 is a section on the line IV—IV.

As FIGS. 1 and 2 shown, the pipeline 1 to be laid has to be towed by a boat 1a over the bed of the body of water 2, to the location of final laying and is provided at intervals with floats 3 attached to it for example by hoops 4 of metal or plastic material. The volume of the floats which may be filled with gas or a liquid lighter than water, for example a hydrocarbon, as well as the interval between them, is contrived in such a fashion that the assembly of pipeline and floats has a certain buoyancy which tends to return it to the surface. However, to the floats or to certain of them, there are attached, symetrically to either side of the pipeline, metal chains 5.

As FIG. 3 shows, the floats have a diameter greater than that of the pipeline so that the chains can hang to either side thereof, or, again, the attachments 5a for the chains, on each float, can be arranged at the ends of a cross member attached to the float and providing a suitable clearance between the chains and the pipeline. The chains have a length such that their weight, when the assembly of pipeline and floats is sufficiently far from the bed of the body of water for the chains to hang freely without touching the said bed, gives the assembly a negative buoyancy tending to displace it towards the bed. The system then develops an equilibrium condition in which the chains rest partly upon the bed of the body of water, the weight of the pendant parts balancing the buoyancy of the assembly of pipeline and floats. As can be seen, the chains thus do duty as a guide rope, maintaining the pipeline immersed at a certain height above the bed of the body of water. The pipeline can thus be towed in the submerged state, to the point of final laying, without any risk of it being damaged by striking hard parts of the bed of the body of water.

At the site of laying, the floats can be detached from the pipeline by releasing the hoops 4, for example by remote-operation of explosive bolts 6 attached to the hoops, or by mechanical attachments operated by cables, or again by using divers.

The floats when separated from the pipeline return to the surface and carry with them the chains which can then readily be recovered without any special operation being required in respect of them.

It goes without saying, of course, that the embodiment described has been given purely by way of example and could be modified, in particular by the substitution of equipment techniques, without in so doing departing from the scope of the invention.

The chains could be replaced by any equivalent, heavy, flexible element.

I claim:

1. Apparatus for recovering guide chains in a device for laying a submarine pipeline comprising means for towing the pipeline and displacing it parallel to the sea bed, comprising in combination, a float, attaching means for removably attaching said float to said pipeline, a chain, means securing said chain to said float, and release means separating the float from said pipeline to carry therewith said chain to the surface.

2. A device as claimed in claim 1, wherein two chains are secured to said float symmetrically on opposite sides of said pipeline and with a mutual clearance therebetween larger than the outer diameter of said pipeline.

3. A device as claimed in claim 2, wherein said float has a width larger than the diameter of said pipeline said securing means being symmetrically located, on said float, in a direction transverse with respect to said pipeline at a mutual distance larger than the outer diameter of said pipeline.

4. A device as claimed in claim 1, wherein said float is superimposed onto said pipeline, said attaching means comprising hoops secured around said pipeline and said float, and said release means comprises explosive means for releasing said hoops to separate said float and attached chain from said pipeline.

* * * * *